Patented May 6, 1941

2,241,247

UNITED STATES PATENT OFFICE 2,241,247

AZO COMPOUNDS AND MATERIAL COLORED THEREWITH

Joseph B. Dickey, Rochester, N. Y., assignor to Eastman Kodak Company, Rochester, N. Y., a corporation of New Jersey No Drawing. Application April 30, 1940, Serial No. 332,581

17 Claims. (Cl. 260—206)

This invention relates to the art of dyeing or coloring. More particularly it relates to new aromatic azo dye compounds and the application of the nuclear non-sulfonated compounds for the coloration of organic derivatives of cellulose especially textile materials made of or containing an organic derivative of cellulose by dyeing, printing, stenciling or like methods.

Organic derivatives of cellulose are characterized by an indifferent affinity for the usual cotton and wool dyes especially the ordinary water soluble dyes. Because of this, it has been necessary to develop new dye compounds suitable for the dyeing or coloration of materials, such as textile materials, made of or containing an organic derivative of cellulose. It is, accordingly, an object of my invention to provide a new class of azo dyes suitable for the dyeing or coloration of organic derivatives of cellulose. Another object is to provide a process for the coloration of organic derivatives of cellulose in which the dye or dyes are applied directly from an aqueous suspension to the materials undergoing coloration. A further object is to produce dyeings on organic derivatives of cellulose which are of good fastness to light and washing. Other objects will hereinafter appear.

Typical organic derivatives of cellulose include the hydrolyzed as well as the unhydrolyzed cellulose organic acid esters such as cellulose acetate, cellulose formate, cellulose propionate, or cellulose butyrate and the hydrolyzed as well as the unhydrolyzed mixed organic acid esters of cellulose such as cellulose acetate-propionate, cellulose acetate-butyrate, and the cellulose ethers such as methyl cellulose, ethyl cellulose, or benzyl cellulose. While my invention will be illustrated more particularly in connection with the coloration of cellulose acetate, a material to which the invention is especially adapted, it will be understood that it applies to the coloration of other organic derivatives of cellulose such as those just mentioned.

The azo dye compounds of my invention have the general formula:

R—N=N—R₁ wherein R represents the residue of an aromatic nucleus and R₁ represents the residue of a benzene nucleus having but one benzene ring containing a

group, wherein $R_2$ and $R_3$ each represents a member selected from the group consisting of an aliphatic group, a cycloalkyl group, a phenyl group and a furyl group and wherein $R_3$ may be in addition hydrogen, attached thereto in para position to the azo bond shown and a member selected from the group consisting of

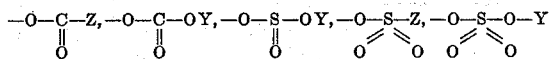

and an acid ester of an acid of phosphorus group, wherein Y and Z each represents a member selected from the group consisting of hydrogen, an aliphatic group, a cycloalkyl group, a phenyl group and a furyl group and wherein Y may be in addition an alkali-forming metal, attached thereto in ortho or meta position to the azo bond shown. Advantageously R is the residue of an aryl nucleus of the benzene series containing but one benzene ring.

While my invention relates broadly to the azo dye compounds having the above formula, it relates more particularly to the azo dye compounds having the general formula:

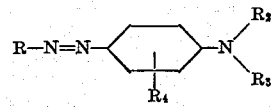

wherein R, $R_2$ and $R_3$ have the meaning previously assigned to them and $R_4$ represents a member selected from the group consisting of

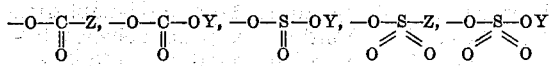

and an acid ester of an acid of phosphorus group, wherein Y and Z each represents a member selected from the group consisting of hydrogen, an aliphatic group, a cycloalkyl group, a phenyl group and a furyl group and wherein Y may be in addition an alkali-forming metal.

It will be understood that the term "an aliphatic group" as used herein and in the claims, unless otherwise indicated, includes not only unsubstituted alkyl groups such as a methyl group, an ethyl group, a propyl group or a butyl group but also substituted alkyl groups such as β-hydroxyethyl, β-hydroxypropyl, β,γ-di-hydroxypropyl, γ-hydroxypropyl, β-methoxyethyl, β-ethoxyethyl, β-sulfoethyl, γ-sulfopropyl, β-sulfatoethyl, β-phosphatoethyl or γ-phosphatopropyl, for example. Similarly, this term includes unsaturated groups such as allyl and —CH₂CH=CHCH₃. Illustrative of cycloalkyl may be mentioned cyclobutyl, cyclohexyl and cycloheptyl. Similarly, illustrative of furyl may be mentioned furfuryl, tetrahydrofurfuryl, 5-ethyltetrahydrofurfuryl and 5-βhydroxyethyltetrahydrofurfuryl. Again, it will be understood that the expression "a phenyl group" includes not only phenyl but phenyl groups substituted, for example, with a halogen atom such as chlorine and bromine, an alkyl group, a hydroxy group and a nitro group.

The azo dye compounds of my invention can be prepared by diazotizing suitable primary aromatic amines and coupling the diazonium compounds obtained with benzene coupling compounds containing a

group, wherein $R_2$ and $R_3$ have the meaning previously assigned to them, and a member selected from the group consisting of

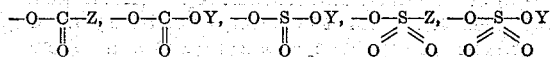

and an acid ester of an acid of phosphorus group, wherein Y and Z similarly have the meaning previously assigned to them, in ortho or meta position to said

group. It will be noted that as coupling is to take place in para position to the

group no group should be present in the benzene nucleus which would prevent coupling in this position.

Suitable aromatic amines that can be employed in the preparation of the azo dye compounds of my invention include, for example, p-nitroaniline, 1-amino-2,4-dinitro-6-chlorobenzene, 1-amino-2-nitro-4-chlorobenzene, 1-amino-2-bromo-4-nitrobenzene, 1-amino-2,4-dinitrobenzene, 1-amino-2,4-dichloro-(or bromo) benzene, p-aminoacetophenone, 1-amino-2,4-dinitro-6-cyanobenzene, 1-amino-2-chloro-4-methylbenzene, 1-amino-2-methyl-4-bromobenzene, 1-amino-2-propyl-4-chlorobenzene, p-aminoazobenzene, α-naphthylamine, 1-amino-5-naphthol, 1-amino-4-nitronaphthalene, p-aminobenzophenone, p-aminobenzenesulfonamide, methyl anthranilate, 1-amino-4-ethylamino anthraquinone, 1-amino-4-phenylamino anthraquinone, 2-aminobenzothiazole and 2-amino-6-methyl benzothiazole.

Suitable coupling components that can be employed in the preparation of the compounds of my invention include, for example, o-acetyl di-β-hydroxyethylaminophenol, m-propionyl mono-β-methoxyethylaminophenol,

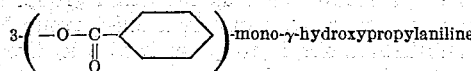
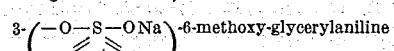
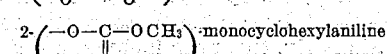
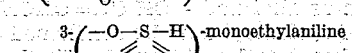

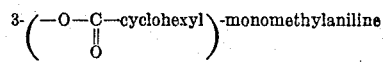
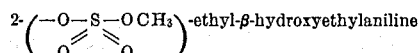
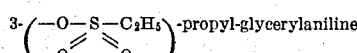
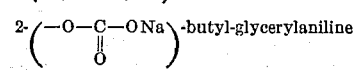
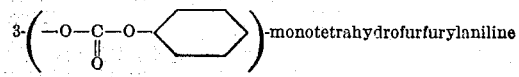
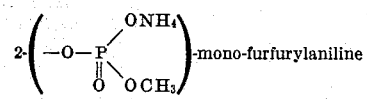
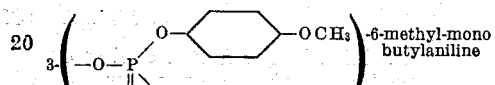
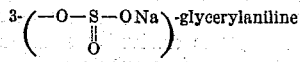
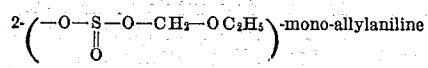

and

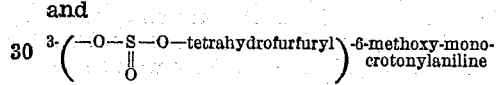

It will be understood that in the nomenclature employed above the amino group occupies the 1 position.

The azo dye compounds of my invention, depending upon their structure, constitute valuable dyes for the coloration of organic derivatives of cellulose, wool and silk. As previously indicated the nuclear non-sulfonated azo dye compounds can be employed for the coloration of organic derivatives of cellulose such as those hereinbefore mentioned yielding various shades thereon of good fastness to light and washing. These nuclear non-sulfonated dye compounds likewise possess some application for the coloration of wool and silk and yield generally similar shades on these materials as on organic derivatives of cellulose. The nuclear sulfonated compounds of my invention possess little or no utility for the coloration of organic derivatives of cellulose but can be employed to color textile materials such as wool and silk. These nuclear sulfonated compounds can be prepared in known fashion as, for example, by the use of previously sulfonated components or by subsequent sulfonation of the unsulfonated compounds. For the dyeing of organic derivaties of cellulose especially cellulose acetate silk, nuclear non-sulfonated compounds wherein R represents the residue of an aryl nucleus of the benzene series containing but one benzene ring are generally advantageous.

The following examples illustrate the preparation of the azo dye compounds of my invention.

*Example 1*

12.8 grams of o-chloroaniline are dissolved in 200 grams of a water and ice mixture to which has been added 25 cc. of 36% hydrochloric acid. The resulting solution is cooled if necessary to about 0–5° C. and the o-chloroaniline is diazotized by adding with stirring 6.9 grams of sodium nitrite dissolved in water while maintaining the temperature at about 0–5° C.

18.9 grams of m-acetyl dimethylaminophenol are dissolved in glacial acetic acid and the resulting solution is cooled to a temperature approximating 0-10° C. The diazonium solution prepared as described above is then slowly added with stirring while maintaining a temperature of 0-10° C. following which the mixture is immediately made neutral to Congo red paper by the addition of sodium acetate. Upon completion of the coupling reaction the dye compound formed is precipitated by adding water, recovered by filtration, washed with water and dried. The dye compound obtained colors cellulose acetate silk yellow.

*Example 2*

13.6 grams of p-aminoacetophenone are diazotized in known fashion and the diazonium compound obtained is coupled with 25.5 grams of m-lactyl-di-β-hydroxyethylaminophenol. Coupling and recovery of the dye compound may be carried out in accordance with the general method described in Example 1. The dye compound obtained colors cellulose acetate silk orange.

*Example 3*

13.8 grams of p-nitroaniline are diazotized in known fashion and the diazonium compound obtained is coupled with 24.3 grams of 3-acetyl-6-methoxy ethyl-β-hydroxyethylaminophenol,

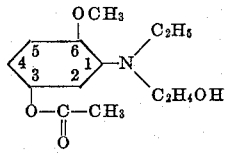

Coupling and recovery of the dye compound formed can be carried out in accordance with the method described in Example 1. The dye compound obtained colors cellulose acetate silk red.

An equivalent gram molecular weight of

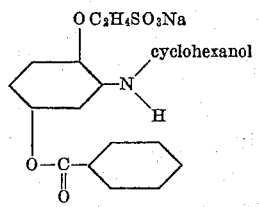

can be substituted for the coupling component of this example to obtain a dye compound which colors cellulose acetate silk red.

*Example 4*

21.7 grams of 1-amino-2-bromo-4-nitrobenzene are diazotized in known fashion and the diazonium compound obtained is coupled with .1 gram mole of

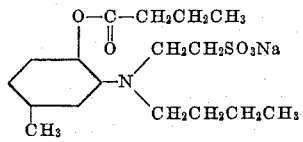

Coupling and recovery of the dye compound formed can be carried out in accordance with the general procedure described in Example 1. The dye compound obtained colors cellulose acetate silk rubine.

*Example 5*

26.2 grams of 1-amino-2,4-dinitro-6-bromoaniline are diazotized in known fashion and the diazonium compound obtained is coupled with .1 gram mole of

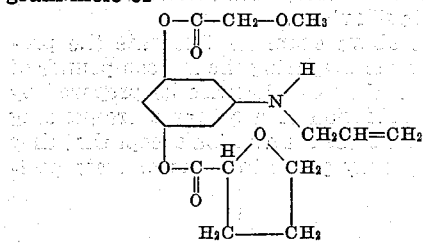

Coupling and recovery of the dye compound formed can be carried out in accordance with the general procedure described in Example 1. The dye compound obtained colors cellulose acetate silk violet.

Equal molecular weights of 1-amino-2,4,6-trinitrobenzene, 2,4-dinitro-α-naphthylamine and 1-amino-4-mehylaminoanthraquinone can be substituted for the diazo component of the example to obtain dye compounds of my invention.

*Example 6*

.1 gram molecular weight of

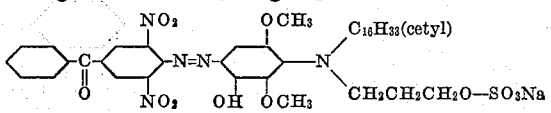

is dissolved in dioxane and treated with .1 gram molecular weight of sodium carbonate and an equivalent amount of p-toluenesulfonyl chloride. By this reaction a dye product of my invention is obtained in which the hydroxyl group shown in the above formula is converted to a

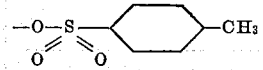

group.

In place of p-toluene sulfonyl chloride,

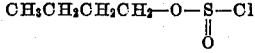

can be employed to obtain dye compounds of my invention.

*Example 7*

.1 gram mole of 1-amino-2,4-dinitro-6-chlorobenzene is diazotized in known fashion and the diazonium compound obtained is coupled with .1 gram mole of

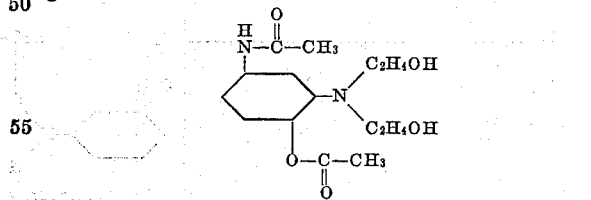

Coupling and recovery of the dye compound formed can be carried out in accordance with the general method described in Example 1. The dye compound obtained colors cellulose acetate silk greenish-blue.

.1 gram mole of 1-amino-2,4-dinitrobenzene can be substituted for the diazo component of the above example to obtain a dye which similarly colors cellulose acetate silk a greenish-blue shade.

*Example 8*

.1 gram mole of 2-amino-5-nitrophenylmethylsulfone are diazotized in known fashion and the diazonium compound obtained is coupled with .1 gram mole of 3-methyl-6-acetoxy-di-β-hydroxyethylaniline. Coupling and recovery of the dye compound formed can be carried out in accordance with the general procedure described in Example 1. The dye compound obtained colors cellulose acetate silk violet.

While the above examples illustrate the preferred method of preparing the azo compounds of my invention, they can likewise be prepared by suitable esterification of azo dyes corresponding to those of the present invention except that they contain a hydroxy group in ortho or meta position to the

group instead of the ester group present in the compounds of the present invention.

The following tabulation further illustrates the compounds included within the scope of my invention together with the colors they produce on cellulose acetate silk. The compounds indicated below may be prepared by diazotizing the amines listed under the heading "Amine" and coupling the diazonium compounds obtained with the compounds specified in the column entitled "Coupling component." The diazotization and coupling reactions may, for example, be carried out following the general procedure described in Examples 1 to 8, inclusive.

| Amine | Coupling component | Color |
|---|---|---|
| o-(F,Cl,Br,I)-aniline | (1) 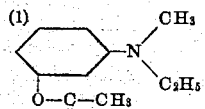 | Yellow. |
| Do | (2) 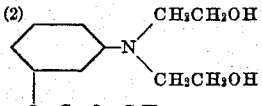 | Do. |
| Do | (3) 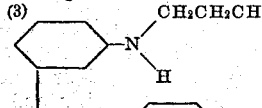 | Do. |
| Do | (4) 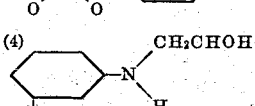 | Do. |
| Do | (5) 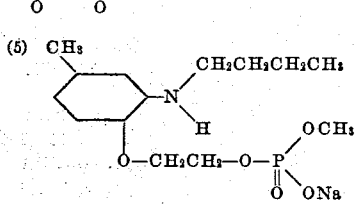 | Do. |
| Do | (6) 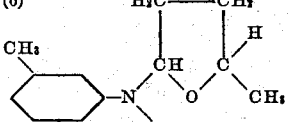 | Do. |
| Do | (7) 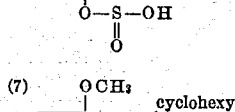 | Do. |
| Do | (8) 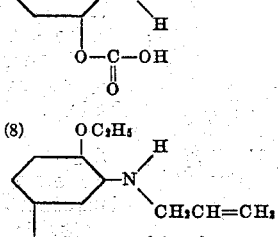 | Do. |

| Amine | Coupling component | | Color |
|---|---|---|---|
| o-(F,Cl,Br,I)-aniline | (9) | 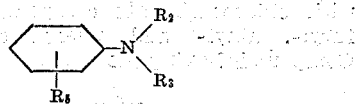 | Yellow. |
| Do | (10) | CH₃ ... CH₂COONa ... (structure) | Do. |
| Do | (11) | O—CH₂CH₂SO₃Na ... cyclohexanol (o, m or p) ... (structure) | Do. |
| 1-amino-2,4-dichlorobenzene | 1 to 11 inclusive | | Orange-yellow. |
| 1-amino-2-chloro-4-bromobenzene | do | | Do. |
| 1-amino-2,5-dibromobenzene | do | | Do. |
| 1-amino-2-chloro-5-bromobenzene | do | | Do. |
| o-nitroaniline | do | | Orange-red. |
| m-nitroaniline | do | | Orange. |
| p-nitroaniline | do | | Red. |
| 1-amino-2-nitro-4-chlorobenzene | do | | Do. |
| 1-amino-2-chloro-4-nitrobenzene | do | | Rubine. |
| 1-amino-2-methoxy-4-nitrobenzene | do | | Red. |
| 1-amino-2-phenoxy-4-nitrobenzene | do | | Do. |
| p-aminoacetophenone | do | | Orange. |
| p-aminobenzophenone | do | | Do. |
| 1-amino-2,4-dinitro-6-chlorobenzene | do | | Purple. |
| 2,4-dinitro-α-naphthylamine | do | | Bluish-purple. |
| 2-amino-5-nitrophenyl methyl sulfone | do | | Rubine. |
| 2-amino-5-nitromethyl benzoate | do | | Do. |
| 2-amino-3,5-dinitrobenzamide | do | | Purple. |
| 1-amino-2-phenoxy-4-chlorobenzene | do | | Orange-yellow. |

In order to avoid possible confusion it is here noted that the coupling components designated o-acetyl di-β-hydroxyethylaminophenol and m-propionyl mono-β-methoxyethylaminophenol refer to

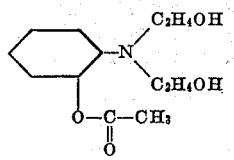

and

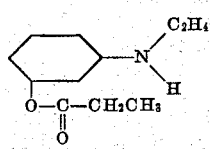

respectively.

Sulfonated amines which can be diazotized and the diazonium compounds obtained coupled with any of the coupling components shown herein to obtain dye compounds of my invention include, for example, p-sulfanilic acid, 1-amino-4-sulfonic naphthalene, 2-naphthylamine-8-sulfonic acid, 1-naphthylamine-3-sulfonic acid, 1-naphthylamine-5-sulfonic acid, 1-naphthylamine-6-sulfonic acid, 1-naphthylamine-4,8-disulfonic acid, 1-naphthylamine-3,8-disulfonic acid, 1-amino-5-naphthol-7-sulfonic acid, metanilic acid, 1-amino-2-sulfonic-4-nitrobenzene, 1-amino-2,4-disulfonic benzene and 1-amino-2-chloro-4-sulfonic benzene.

In order that my invention may be completely understood, the preparation of various coupling components employed in the preparation of the compounds of my invention is described hereinafter.

The coupling components of my invention can ordinarily be prepared from compounds having the general formula:

wherein $R_2$ and $R_3$ have the meaning previously assigned to them and $R_5$ represents a hydroxy group attached to the benzene nucleus in ortho or meta position to the $$-N\begin{matrix}R_2\\R_3\end{matrix}$$

group.

By reaction of the above compounds with compounds having the general formula $$Z-\underset{\underset{O}{\|}}{C}-Cl$$

the $$-O-\underset{\underset{O}{\|}}{C}-Z$$

grouping can be introduced in ortho or meta position to the

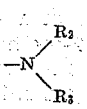

group. Similarly by reaction with compounds having the general formula

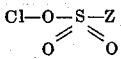

the

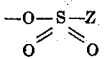

grouping can be introduced in ortho or meta position to the

group. This latter reaction is shown in Example 6. Z in the formulas just given is aliphatic, phenyl or furyl.

Further by reaction with compounds having the general formula

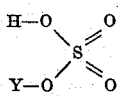

the

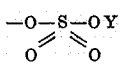

group can be similarly introduced. Y in the foregoing formulas represents hydrogen or aliphatic. Illustrative of the aforesaid compounds may be mentioned concentrated sulfuric acid and ethyl sulfuric acid.

The

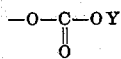

grouping can be introduced by reacting the compounds above mentioned having the general formula:

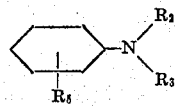

with chlorocarbonate compounds such as the furyl-, alkyl- and phenyl-chlorocarbonates. Compounds having the

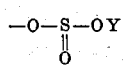

grouping can be prepared by reacting the above mentioned compounds with sulfonyl chlorides such as methyl sulfonyl chloride, ethyl sulfonyl chloride and phenyl sulfonyl chloride, for example.

The following examples illustrate the preparation of the coupling components of my invention.

Example A

One gram mole of 2-methoxy-5-hydroxy-1-ethylamino benzene is heated in an autoclave with one gram mole of ethylene oxide at 180° C. for 6 hours. The reaction product resulting is cooled, removed from the reaction vessel and distilled under reduced pressure. The 2-methoxy-5-hydroxy-1-(ethyl, hydroxyethyl)-amino benzene obtained is dissolved in dilute sodium hydroxide and treated with an equivalent amount of acetyl chloride. 2-methoxy-5-acetoxy-1-(ethyl, hydroxyethyl)-aminobenzene is formed and can be recovered by distillation under reduced pressure.

Example B

One gram mole of 1-nitro-3,5-dihydroxybenzene is reacted with one gram mole of methoxy acetic anhydride at 50° C. to form 1-nitro-3-hydroxy-5-methoxy acetobenzene, which is in turn treated in cold dilute alkali with an equivalent gram molecular weight of tetrahydrofuroyl chloride. The resulting diester is purified by crystallization from alcohol and reduced to the amino compound in alcohol with hydrogen and nickel. The amino compound formed is treated in benzene with sodium bicarbonate and allyl bromide to give the coupling component employed in Example 5.

From the foregoing it is believed that the preparation of the coupling components employed in the preparation of the azo dye compounds of my invention will be clearly understood by those skilled in the art to which this invention relates.

In addition we would here note that coupling compounds of the general formula

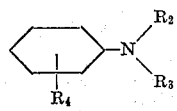

wherein $R_2$ and $R_3$ have the meaning previously assigned to them and $R_4$ represents an acid ester of an acid of phosphorus group attached to the benzene nucleus in ortho or meta position to the

group can be prepared by reacting compounds having the general formula

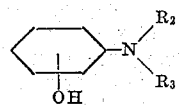

wherein $R_2$ and $R_3$ have the meaning previously assigned to them and wherein the hydroxy group is attached to the benzene nucleus in ortho or meta position to the

group with a phosphating agent. Phosphating agents which can be employed to prepare phosphoric and thiophosphoric acid esters are described in U. S. Patent No. 2,183,998, issued December 19, 1939. Phosphating agents which can be employed to prepare phosphorous acid esters include phosphorus trichloride and those described in application Serial No. 266,646, filed April 7, 1939.

The azo dye compounds of my invention are, for the most part, relatively insoluble in water. Those compounds which are insoluble in water may be advantageously employed for the direct dyeing of textile materials by grinding the dye to a fine powder, intimately mixing it with a suitable dispersing or solubilizing agent and adding the resulting mixture to water or a dilute solution of soap in water to form an aqueous dyebath. Following this known preparation of the dyebath, the textile material to be dyed may be added to the dyebath and the dyeing operation conducted in known fashion. The dye compounds of my invention which are water soluble do not, of course, require the use of a dispersing or solubilizing agent but may be applied to silk, wool and (depending upon the nature and position of the water solubilizing group) organic derivatives of cellulose textile materials from an aqueous solution of the dye which may contain salt. For a more complete description as to how the azo dye compounds of my invention may be employed in dyeing or coloring operations, reference may be had to McNally and Dickey U. S. Letters Patent No. 2,115,030, issued April 26, 1938. For a more detailed description as to how the water soluble azo dyes of my invention may be employed for the coloration of textile materials made of or containing organic derivatives of cellulose, silk and wool or mixtures of these, reference may be had to McNally and Dickey U. S. Patent No. 2,107,898, issued February 8, 1938.

I claim:

1. The azo dye compounds having the general formula:

$$R-N=N-R_1$$

wherein R represents the residue of an aromatic nucleus and $R_1$ represents the residue of a benzene nucleus having but one benzene ring containing a $$-N\begin{matrix}R_2\\R_3\end{matrix}$$

group, wherein $R_2$ and $R_3$ each represents a member selected from the group consisting of an aliphatic group, a cycloalkyl group, a phenyl group and a furyl group and wherein $R_3$ may be in addition hydrogen, attached thereto in para position to the azo bond shown and a member selected from the group consisting of $$-O-\underset{\underset{O}{\|}}{C}-Z,\ -O-\underset{\underset{O}{\|}}{C}-OY,\ -O-\underset{\underset{O}{\|}}{S}-OY,\ -O-\underset{O\nwarrow\ \nearrow O}{S}-Z,\ -O-\underset{O\nwarrow\ \nearrow O}{S}-O-Y$$

and an acid ester of an acid of phosphorus group, wherein Y and Z each represents a member selected from the group consisting of hydrogen, an aliphatic group, a cycloalkyl group, a phenyl group and a furyl group and wherein Y may be in addition an alkali-forming metal, attached thereto in ortho or meta position to the azo bond shown.

2. The azo dye compounds having the general formula:

$$R-N=N-R_1$$

wherein R represents the residue of an aryl nucleus of the benzene series containing but one benzene ring and $R_1$ represents the residue of a benzene nucleus having but one benzene ring containing a $$-N\begin{matrix}R_2\\R_3\end{matrix}$$

group, wherein $R_2$ and $R_3$ each represents a member selected from the group consisting of an aliphatic group, a cycloalkyl group, a phenyl group and a furyl group and wherein $R_3$ may be in addition hydrogen, attached thereto in para position to the azo bond shown and a member selected from the group consisting of $$-O-\underset{\underset{O}{\|}}{C}-Z,\ -O-\underset{\underset{O}{\|}}{C}-OY,\ -O-\underset{\underset{O}{\|}}{S}-OY,\ -O-\underset{O\nwarrow\ \nearrow O}{S}-Z,\ -O-\underset{O\nwarrow\ \nearrow O}{S}-O-Y$$

and an acid ester of an acid of phosphorus group, wherein Y and Z each represents a member selected from the group consisting of hydrogen, an aliphatic group, a cycloalkyl group, a phenyl group and a furyl group and wherein Y may be in addition an alkali-forming metal, attached thereto in ortho or meta position to the azo bond shown.

3. The azo dye compounds having the general formula:

$$R-N=N-R_1$$

wherein R represents the residue of an aryl nucleus of the benzene series containing but one benzene ring and $R_1$ represents the residue of a benzene nucleus having but one benzene ring containing a $$-N\begin{matrix}R_2\\R_3\end{matrix}$$

group, wherein $R_2$ and $R_3$ each represents an aliphatic group and $R_3$ may be in addition hydrogen, attached thereto in para position to the azo bond shown and a member selected from the group consisting of $$-O-\underset{\underset{O}{\|}}{C}-Z,\ -O-\underset{\underset{O}{\|}}{C}-OY,\ -O-\underset{\underset{O}{\|}}{S}-OY,\ -O-\underset{O\nwarrow\ \nearrow O}{S}-Z,\ -O-\underset{O\nwarrow\ \nearrow O}{S}-O-Y$$

and an acid ester of an acid of phosphorus group, wherein Y and Z each represents a member selected from the group consisting of hydrogen, an aliphatic group, a cycloalkyl group, a phenyl group and a furyl group and wherein Y may be in addition an alkali-forming metal, attached thereto in ortho or meta position to the azo bond shown.

4. The azo dye compounds having the general formula:

$$R-N=N-\underset{R_4}{\bigcirc}-N\begin{matrix}R_2\\R_3\end{matrix}$$

wherein R represents the residue of an aromatic nucleus, $R_2$ and $R_3$ each represents a member selected from the group consisting of an aliphatic-, a cycloalkyl-, a phenyl- and a furyl-group and wherein $R_3$ may be in addition hydrogen and $R_4$ represents a member selected from the group consisting of $$-O-\underset{\underset{O}{\|}}{C}-Z,\ -O-\underset{\underset{O}{\|}}{C}-OY,\ -O-\underset{\underset{O}{\|}}{S}-OY,\ -O-\underset{O\nwarrow\ \nearrow O}{S}-Z,\ -O-\underset{O\nwarrow\ \nearrow O}{S}-OY$$

and an acid ester of an acid of phosphorus group, wherein Y and Z each represents a member selected from the group consisting of hydrogen, an aliphatic group, a cycloalkyl group, a phenyl group and a furyl group and wherein Y may be in addition an alkali-forming metal.

5. The azo dye compounds having the general formula:

$$R-N=N-\underset{R_4}{\bigcirc}-N\begin{matrix}R_2\\R_3\end{matrix}$$

wherein R represents the residue of an aryl nucleus of the benzene series containing but one benzene ring, $R_2$ and $R_3$ each represents a member selected from the group consisting of an aliphatic-, a cycloalkyl-, a phenyl- and a furyl-group and wherein $R_3$ may be in addition hydrogen and $R_4$ represents a member selected from the group consisting of $$-O-\underset{\underset{O}{\|}}{C}-Z,\ -O-\underset{\underset{O}{\|}}{C}-OY,\ -O-\underset{\underset{O}{\|}}{S}-OY,$$

$$-O-\underset{O\nwarrow\ \nearrow O}{S}-Z,\ -O-\underset{O\nwarrow\ \nearrow O}{S}-OY$$

and an acid ester of an acid of phosphorus group, wherein Y and Z each represents a member selected from the group consisting of hydrogen, an aliphatic group, a cycloalkyl group, a phenyl group and a furyl group and wherein Y may be in addition an alkali-forming metal.

6. The azo dye compounds having the general formula:

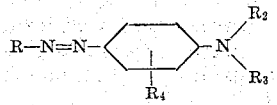

wherein R represents the residue of an aryl nucleus of the benzene series containing but one benzene ring, $R_2$ and $R_3$ each represents an aliphatic group and $R_3$ may be in addition hydrogen and $R_4$ represents a member selected from the group consisting of

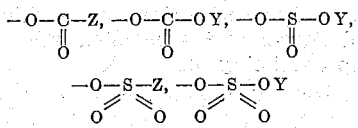

and an acid ester of phosphorus group, wherein Y and Z each represents a member selected from the group consisting of hydrogen, an aliphatic group, a cycloalkyl group, a phenyl group and a furyl group and wherein Y may be in addition an alkali-forming metal.

7. The azo dye having the formula:

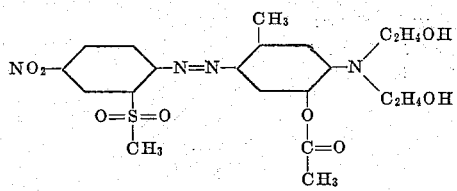

8. The azo dye having the formula:

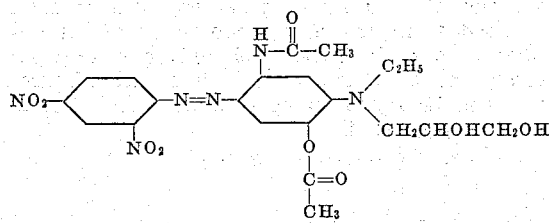

9. The azo dye having the formula:

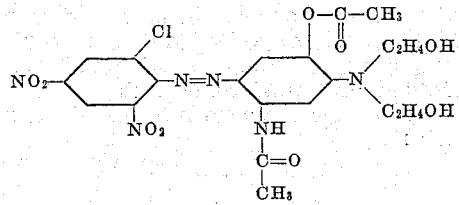

10. Material selected from the group consisting of an organic derivative of cellulose, wool and silk colored with an azo dye compound having the general formula:

wherein R represents the residue of an aromatic nucleus and $R_1$ represents the residue of a benzene nucleus having but one benzene ring containing a

group, wherein $R_2$ and $R_3$ each represents a member selected from the group consisting of an aliphatic group, a cycloalkyl group, a phenyl group and a furyl group and wherein $R_3$ may be in addition hydrogen, attached thereto in para position to the azo bond shown and a member selected from the group consisting of

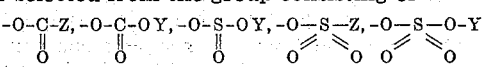

and an acid ester of an acid of phosphorus group, wherein Y and Z each represents a member selected from the group consisting of hydrogen, an aliphatic group, a cycloalkyl group, a phenyl group and a furyl group and wherein Y may be in addition an alkali-forming metal, attached thereto in ortho or meta position to the azo bond shown.

11. An organic derivative of cellulose colored with a nuclear non-sulfonated azo dye compound having the general formula:

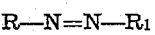

wherein R represents the residue of an aromatic nucleus and $R_1$ represents the residue of a benzene nucleus having but one benzene ring containing a

group, wherein $R_2$ and $R_3$ each represents a member selected from the group consisting of an aliphatic group, a cycloalkyl group, a phenyl group and a furyl group and wherein $R_3$ may be in addition hydrogen, attached thereto in para position to the azo bond shown and a member selected from the group consisting of

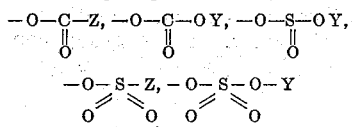

and an acid ester of an acid of phosphorus group, wherein Y and Z each represents a member selected from the group consisting of hydrogen, an aliphatic group, a cycloalkyl group, a phenyl group and a furyl group and wherein Y may be in addition an alkali-forming metal, attached thereto in ortho or meta position to the azo bond shown.

12. An organic derivative of cellulose colored with a nuclear non-sulfonated azo dye compound having the general formula:

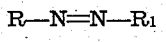

wherein R represents the residue of an aryl nucleus of the benzene series containing but one benzene ring and $R_1$ represents the residue of a benzene nucleus having but one benzene ring containing a

group, wherein $R_2$ and $R_3$ each represents a member selected from the group consisting of an aliphatic group, a cycloalkyl group, a phenyl group and a furyl group and wherein $R_3$ may be in addition hydrogen, attached thereto in para position to the azo bond shown and a member selected from the group consisting of

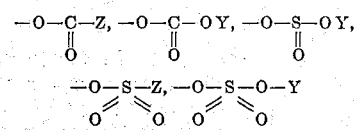

and an acid ester of an acid of phosphorus group, wherein Y and Z each represents a member selected from the group consisting of hydrogen, an aliphatic group, a cycloalkyl group, a phenyl group and a furyl group and wherein Y may be in addition an alkali-forming metal, attached thereto in ortho or meta position to the azo bond shown.

13. An organic derivative of cellulose colored with a nuclear non-sulfonated azo dye compound having the general formula:

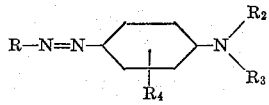

wherein R represents the residue of an aryl nucleus of the benzene series containing but one benzene ring, $R_2$ and $R_3$ each represents a member selected from the group consisting of an aliphatic-, a cycloalkyl-, a phenyl- and a furyl- group and wherein $R_3$ may be in addition hydrogen and $R_4$ represents a member selected from the group consisting of

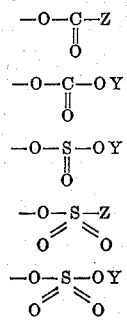

and an acid ester of an acid of phosphorus group, wherein Y and Z each represents a member selected from the group consisting of hydrogen, an aliphatic group, a cycloalkyl group, a phenyl group and a furyl group and wherein Y may be in addition an alkali-forming metal.

14. A cellulose acetate colored with a nuclear non-sulfonated azo dye compound having the general formula:

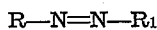

wherein R represents the residue of an aromatic nucleus and $R_1$ represents the residue of a benzene nucleus having but one benzene ring containing a

group, wherein $R_2$ and $R_3$ each represents a member selected from the group consisting of an aliphatic group, a cycloalkyl group, a phenyl group and a furyl group and wherein $R_3$ may be in addition hydrogen, attached thereto in para position to the azo bond shown and a member selected from the group consisting of

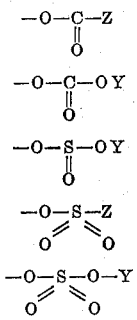

and an acid ester of an acid of phosphorus group, wherein Y and Z each represents a member selected from the group consisting of hydrogen, an aliphatic group, a cycloalkyl group, a phenyl group and a furyl group and wherein Y may be in addition an alkali-forming metal, attached thereto in ortho or meta position to the azo bond shown.

15. A cellulose acetate colored with a nuclear non-sulfonated azo dye compound having the general formula:

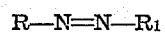

wherein R represents the residue of an aryl nucleus of the benzene series containing but one benzene ring and $R_1$ represents the residue of a benzene nucleus having but one benzene ring containing a

group, wherein $R_2$ and $R_3$ each represents a member selected from the group consisting of an aliphatic group, a cycloalkyl group, a phenyl group and a furyl group and wherein $R_3$ may be in addition hydrogen, attached thereto in para position to the azo bond shown and a member selected from the group consisting of

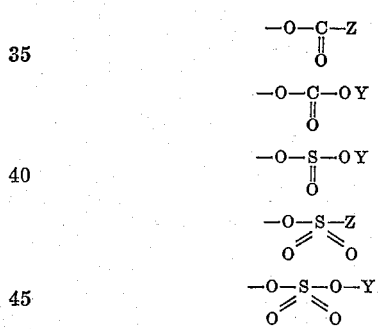

and an acid ester of an acid of phosphorus group, wherein Y and Z each represents a member selected from the group consisting of hydrogen, an aliphatic group, a cycloalkyl group, a phenyl group and a furyl group and wherein Y may be in addition an alkali-forming metal, attached thereto in ortho or meta position to the azo bond shown.

16. A cellulose acetate colored with a nuclear non-sulfonated azo dye compound having the general formula:

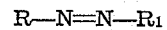

wherein R represents the residue of an aryl nucleus of the benzene series containing but one benzene ring and $R_1$ represents the residue of a benzene nucleus having but one benzene ring containing a

group, wherein $R_2$ and $R_3$ each represents an aliphatic group and $R_3$ may be in addition hydrogen, attached thereto in para position to the azo bond shown and a member selected from the group consisting of

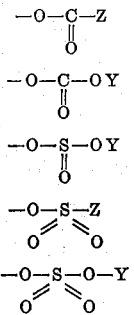

and an acid ester of an acid of phosphorus group, wherein Y and Z each represents a member selected from the group consisting of hyrogen, an aliphatic group, a cycloalkyl group, a phenyl group and a furyl group and wherein Y may be in addition an alkali-forming metal, attached thereto in ortho or meta position to the azo bond shown.

17. A cellulose acetate colored with a nuclear non-sulfonated azo dye compound having the general formula:

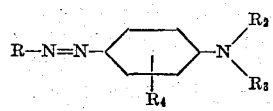

wherein R represents the residue of an aryl nucleus of the benzene series containing but one benzene ring, $R_2$ and $R_3$ each represents a member selected from the group consisting of an aliphatic-, a cycloalkyl-, a phenyl- and a furyl-group and wherein $R_3$ may be in addition hydrogen and $R_4$ represents a member selected from the group consisting of

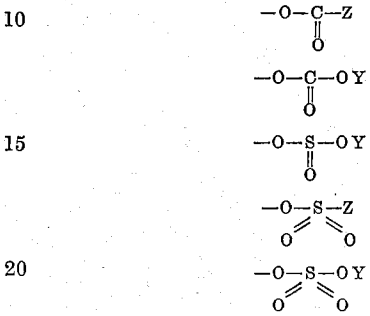

and an acid ester of an acid of phosphorus group, wherein Y and Z each represents a member selected from the group consisting of hydrogen, an aliphatic group, a cycloalkyl group, a phenyl group and a furyl group and wherein Y may be in addition an alkali-forming metal.

JOSEPH B. DICKEY.